United States Patent
Yokota et al.

(10) Patent No.: US 11,552,364 B2
(45) Date of Patent: Jan. 10, 2023

(54) POWER SUPPLY APPARATUS AND BRANCH CONNECTOR APPARATUS

(71) Applicants: Sumitomo Wiring Systems, Ltd., Yokkaichi (JP); Honda Motor Co., Ltd., Tokyo (JP)

(72) Inventors: Tomohiro Yokota, Yokkaichi (JP); Masashi Hayashi, Yokkaichi (JP); Yutaka Kobayashi, Yokkaichi (JP); Ryo Kitano, Wako (JP); Ryo Fujii, Wako (JP); Hiroo Yamaguchi, Wako (JP); Atsushi Nakano, Wako (JP)

(73) Assignees: Sumitomo Wiring Systems, Ltd., Yokkaichi (JP); HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 17/028,450

(22) Filed: Sep. 22, 2020

(65) Prior Publication Data

US 2021/0098762 A1    Apr. 1, 2021

(30) Foreign Application Priority Data

Sep. 26, 2019 (JP) .............................. JP2019-175703

(51) Int. Cl.
*H01M 50/20* (2021.01)
*H01R 13/688* (2011.01)
(Continued)

(52) U.S. Cl.
CPC ......... *H01M 50/20* (2021.01); *H01M 50/502* (2021.01); *H01M 50/572* (2021.01);
(Continued)

(58) Field of Classification Search
CPC .. H01M 50/20; H01M 50/502; H01M 50/572; H01R 13/688; H01R 13/512
(Continued)

(56) References Cited

U.S. PATENT DOCUMENTS

| 5,645,448 A * | 7/1997 | Hill | ............... H01H 85/205 |
| | | | 439/522 |
| 6,503,093 B1 * | 1/2003 | Sakata | ............... H01R 12/721 |
| | | | 439/328 |

(Continued)

FOREIGN PATENT DOCUMENTS

| CN | 201540915 U | 8/2010 |
| CN | 207559179 U | 6/2018 |

(Continued)

OTHER PUBLICATIONS

First Chinese Office Action, Application No. 202011021104.2, dated Aug. 26, 2022.

(Continued)

*Primary Examiner* — Alexander Gilman
(74) *Attorney, Agent, or Firm* — Honigman LLP

(57) ABSTRACT

A power supply apparatus includes a battery pack for a motor vehicle, and a power interface part that connects the battery pack and a plurality of electrical devices. The power interface part includes a battery-side connector, and a branch connector apparatus. The branch connector apparatus includes a joining part for connection lines, a fuse, a housing, and a connector. A guided part is provided on an outer side surface of the housing. The battery pack includes a slot part allowing the branch connector apparatus to be inserted and extracted. The battery-side connector is provided in the slot part. A guiding part extending along an insertion and extraction direction is provided on an inner side surface of the slot part. The guided part is guided along an extension direction of the guiding part by the guiding part.

14 Claims, 12 Drawing Sheets

(51) Int. Cl.
*H01M 50/502* (2021.01)
*H01M 50/572* (2021.01)
*H01R 13/512* (2006.01)

(52) U.S. Cl.
CPC ......... *H01R 13/688* (2013.01); *H01R 13/512* (2013.01); *H01R 2201/26* (2013.01)

(58) Field of Classification Search
USPC .......................................................... 439/34
See application file for complete search history.

(56) References Cited

U.S. PATENT DOCUMENTS

| | | | | |
|---|---|---|---|---|
| 7,046,115 | B2* | 5/2006 | Higuchi | H01H 85/044 |
| | | | | 361/833 |
| 7,192,319 | B1* | 3/2007 | Rahman | H01R 11/12 |
| | | | | 439/766 |
| 7,802,998 | B2* | 9/2010 | Taguchi | H01R 11/12 |
| | | | | 439/949 |
| 7,878,822 | B2* | 2/2011 | Korczynski | B60R 16/0238 |
| | | | | 439/271 |
| 8,638,188 | B2* | 1/2014 | Iwata | G01R 1/0408 |
| | | | | 337/186 |
| 9,099,815 | B2* | 8/2015 | Kashiwada | H01R 12/00 |
| 9,384,929 | B2* | 7/2016 | Masuda | H01H 85/0241 |
| 9,425,018 | B2* | 8/2016 | Nohara | H01H 85/201 |
| 9,589,756 | B2* | 3/2017 | Saimoto | H01H 85/20 |
| 10,916,897 | B1* | 2/2021 | Ramunno | H01R 13/688 |
| 2002/0129470 | A1* | 9/2002 | Kiely | A44B 19/38 |
| | | | | 24/433 |
| 2003/0096528 | A1 | 5/2003 | Fukamachi | |
| 2006/0003627 | A1* | 1/2006 | Freitag | H01R 13/68 |
| | | | | 439/504 |
| 2009/0309689 | A1* | 12/2009 | Pavlovic | H01R 13/18 |
| | | | | 337/187 |
| 2010/0048059 | A1* | 2/2010 | Lee | H01R 13/5841 |
| | | | | 439/497 |
| 2010/0062627 | A1 | 3/2010 | Ambo et al. | |
| 2010/0093200 | A1* | 4/2010 | Ye | G06K 13/08 |
| | | | | 439/159 |
| 2012/0239836 | A1* | 9/2012 | Enayati | A44B 15/005 |
| | | | | 361/679.31 |
| 2018/0076575 | A1* | 3/2018 | Ramunno | H01R 13/688 |
| 2019/0123495 | A1* | 4/2019 | Darr | B60R 16/0238 |
| 2021/0098762 | A1* | 4/2021 | Yokota | H01M 50/583 |
| 2021/0126229 | A1* | 4/2021 | Zhao | H01M 50/507 |
| 2022/0158148 | A1* | 5/2022 | Burkman | B60K 6/28 |

FOREIGN PATENT DOCUMENTS

| | | |
|---|---|---|
| CN | 108973710 A | 12/2018 |
| CN | 110198861 A | 9/2019 |
| DE | 102017219078 A1 | 5/2018 |
| JP | 2005-524939 A | 8/2005 |
| JP | 2010010944 A | 1/2010 |
| JP | 2013-122820 A | 6/2013 |
| JP | 2013-545231 A | 12/2013 |
| JP | 2015-056339 A | 3/2015 |
| JP | 2015-079723 A | 4/2015 |
| JP | 2016152717 A | 8/2016 |
| JP | 2019153382 A | 9/2019 |
| WO | 2014066601 A1 | 5/2014 |

OTHER PUBLICATIONS

Japanese Office Action, Application No. 2019-175703, dated Sep. 21, 2022.

* cited by examiner

POWER SUPPLY APPARATUS AND BRANCH CONNECTOR APPARATUS

CROSS-REFERENCE TO RELATED APPLICATIONS

This application claims priority of Japanese Patent Application No. JP 2019-175703 filed on Sep. 26, 2019, the contents of which are incorporated herein.

TECHNICAL FIELD

The present disclosure relates to a power supply apparatus and a branch connector apparatus.

BACKGROUND

Japanese Patent Application Laid-Open No. 2014-107151 discloses a connector for a device that incorporates a heat generating component such as a fuse.

Such a connector for a device may be connected to a connector of the device in a state in which the connector for the device enters the device in a certain degree. It is desirable that connection be established smoothly in a case as described above, for example.

SUMMARY

In view of this, the present disclosure has an object to enable smooth connection of a branch connector apparatus to a device.

The present disclosure provides a power supply apparatus including: a battery pack for a motor vehicle; and a power interface part configured to connect the battery pack and a plurality of electrical devices. The power interface part includes a battery-side connector electrically connected to a battery of the battery pack, and a branch connector apparatus to be coupled to the battery-side connector. The branch connector apparatus is configured to supply power from the battery to the plurality of electrical devices in a state in which the branch connector apparatus is coupled to the battery-side connector. The branch connector apparatus includes a joining part configured to electrically join a plurality of connection lines to be connected to respective ones of the plurality of electrical devices, at least one fuse provided to correspond to at least one of the plurality of connection lines, a housing configured to accommodate the joining part and the at least one fuse, a connector to be coupled to the battery-side connector, the connector including a terminal electrically connected to the joining part, and a guided part provided on an outer side surface of the housing. The battery pack includes a slot part allowing the branch connector apparatus to be inserted and extracted, the battery-side connector being provided in the slot part, and a guiding part being provided at a portion of an inner side surface of the slot part facing the guided part, the guiding part extending along an insertion and extraction direction of the branch connector apparatus with respect to the slot part. The guided part is guided along an extension direction of the guiding part by the guiding part.

According to the present disclosure, the branch connector apparatus is smoothly connected to a device.

These and other objects, features, aspects and advantages of the present disclosure will become more apparent from the following detailed description of the present disclosure when taken in conjunction with the accompanying drawings.

DETAILED DESCRIPTION OF THE PREFERRED EMBODIMENTS

Figure 1:
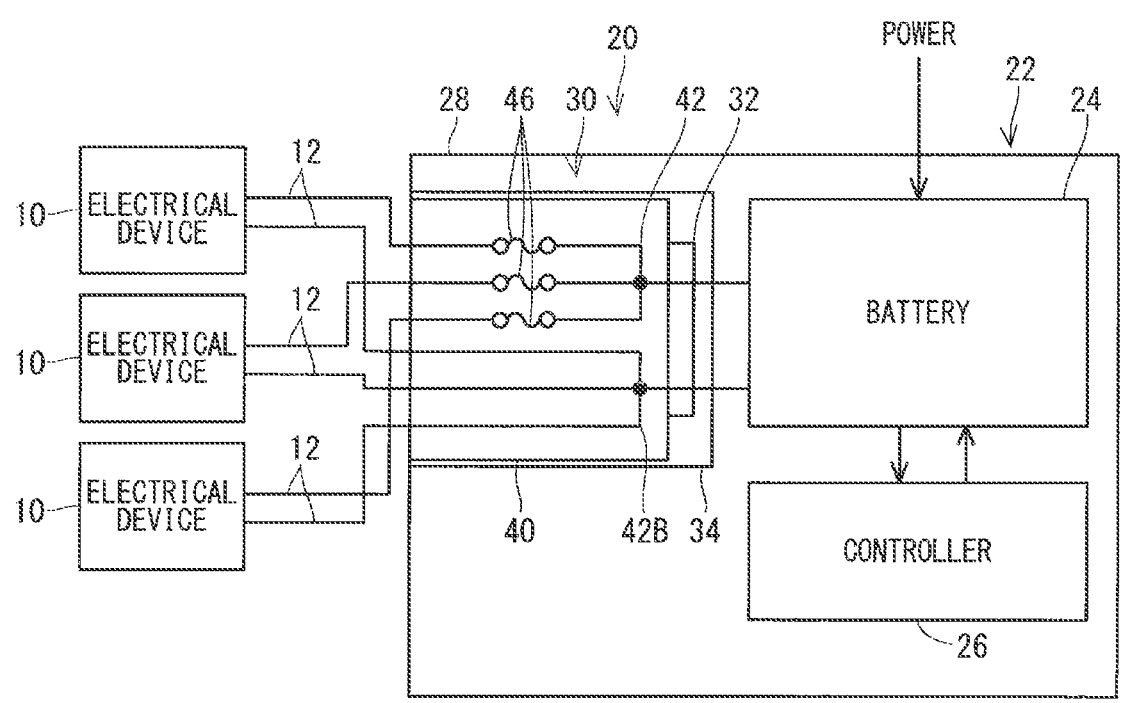
FIG. 1 is a block diagram illustrating an application example of a power supply apparatus and a branch connector apparatus according to the first embodiment.

First, aspects of the present disclosure will be listed and described.

A power supply apparatus according to the present disclosure is as follows.

Provided is a power supply apparatus including: a battery pack for a motor vehicle; and a power interface part configured to connect the battery pack and a plurality of electrical devices. The power interface part includes a battery-side connector electrically connected to a battery of the battery pack, and a branch connector apparatus to be coupled to the battery-side connector. The branch connector apparatus is configured to supply power from the battery to the plurality of electrical devices in a state in which the branch connector apparatus is coupled to the battery-side connector. The branch connector apparatus includes a joining part configured to electrically join a plurality of connection lines to be connected to respective ones of the plurality of electrical devices, at least one fuse provided to correspond to at least one of the plurality of connection lines, a housing configured to accommodate the joining part and the at least one fuse, a connector to be coupled to the battery-side connector, the connector including a terminal electrically connected to the joining part, and a guided part provided on an outer side surface of the housing. The battery pack includes a slot part allowing the branch connector apparatus to be inserted and extracted, the battery-side connector being provided in the slot part, and a guiding part being provided at a portion of an inner side surface of the slot part facing the guided part, the guiding part extending along an insertion and extraction direction of the branch connector apparatus with respect to the slot part. The guided part is guided along an extension direction of the guiding part by the guiding part.

When the branch connector apparatus is inserted into the slot part, the guided part is guided along the extension direction of the guiding part by the guiding part. Further, the connector is connected to the battery-side connector. Thus, the branch connector apparatus is smoothly connected to the battery pack being a type of device.

The at least one fuse, the joining part, and the connector may be disposed along the insertion and extraction direction. In this case, the branch connector apparatus is elongated along the insertion and extraction direction. In such a case, with the guiding part guiding the guided part, the branch connector apparatus is smoothly connected to the battery pack being a type of device.

The connector may be supported at a lateral side of the housing. The connector may be disposed on a further front side in an insertion direction of the branch connector apparatus than the guided part. In this case, the connector is connected to the battery-side connector in a state in which the guided part is guided by the guiding part. Thus, the branch connector apparatus is smoothly connected to the battery pack being a type of device.

The housing may include, in the insertion and extraction direction, a first end portion, and a second end portion farther from the battery-side connector than the first end portion. The guided part may be disposed close to the first end portion in the insertion and extraction direction. In this case, timing for the guiding part to start guiding of the guided part is advanced. Consequently, the branch connector apparatus is smoothly connected to the battery pack being a type of device.

The housing may include a first leading part configured to lead the guided part into the guiding part. The first leading part may be provided at the first end portion of the housing, and may be formed continuously to the guided part in the insertion and extraction direction. In this case, the guided part is led into the guiding part by the first leading part, and thus the guided part is smoothly guided by the guiding part.

The guiding part may include, in the insertion and extraction direction, a first area, and a second area farther from the battery-side connector than the first area. A clearance allowing movement of the guided part with respect to the guiding part in a direction perpendicular to the extension direction of the guiding part may be larger in the first area than in the second area. In this case, the guided part of the branch connector apparatus reaches the first area through the second area. The clearance allowing movement of the guided part with respect to the guiding part in the direction perpendicular to the extension direction of the guiding part is larger in the first area than in the second area. Thus, when the branch connector apparatus is deeply inserted, a higher degree of freedom is provided for the branch connector apparatus. Accordingly, priority shifts from guiding to absorbing a tolerance for the sake of coupling to the battery-side connector. Consequently, the connector and the battery-side connector are smoothly coupled while guiding the branch connector apparatus.

A clearance allowing movement of the guided part with respect to the guiding part in a first direction perpendicular to the insertion and extraction direction may be larger in the first area than in the second area. In this case, when the branch connector apparatus is deeply inserted, a higher degree of freedom is provided for the branch connector apparatus in the first direction perpendicular to the insertion and extraction direction. Accordingly, priority shifts from guiding to absorbing a tolerance for the sake of coupling to the battery-side connector. Consequently, the connector and the battery-side connector are smoothly coupled while guiding the branch connector apparatus.

A clearance allowing movement of the guided part with respect to the guiding part in a second direction perpendicular to both the insertion and extraction direction and the first direction may be larger in the first area than in the second area. In this case, when the branch connector apparatus is deeply inserted, a higher degree of freedom is provided for the branch connector apparatus in the first direction and the second direction perpendicular to the insertion and extraction direction. Accordingly, priority shifts from guiding to absorbing a tolerance for the sake of coupling to the battery-side connector. Consequently, the connector and the battery-side connector are smoothly coupled while guiding the branch connector apparatus.

A length of the guided part may be smaller than a length of the first area in the insertion and extraction direction. In this case, an even higher degree of freedom is securely provided for the branch connector apparatus in a state in which the guided part is located within the first area T1. Consequently, the connector and the battery-side connector are smoothly coupled.

A second leading part configured to lead the guided part into the guiding part may be provided in the slot part. The second leading part may be formed continuously to the guiding part on a side away from the battery-side connector in the insertion and extraction direction. In this case, the guided part is led into the guiding part by the second leading part, and thus the guided part is smoothly guided by the guiding part.

The battery pack may include a case configured to accommodate the slot part inside. The branch connector apparatus may include a tubular part surrounding a part of an outer side surface of the housing, and a water blocking member having an annular shape being provided on an outer side surface of the tubular part. The case may include an opening allowing an internal space of the slot part to communicate with an outer space of the battery pack. The opening may be disposed at a position farther from the battery-side connector than the guiding part in the insertion and extraction direction. The water blocking member may come into contact with an inner side surface of the opening in a state in which the connector and the battery-side connector are coupled. In this case, water is collectively blocked from entering the connector, the joining part, etc. at the same time as when the branch connector apparatus and the battery-side connector are coupled. This eliminates the necessity of individually providing a water blocking structure, allowing for reduction in the number of components.

Further, a branch connector apparatus according to the present disclosure is as follows.

Provided is a branch connector apparatus to be connected to a device including a guiding part on an inner side surface of a slot part. The branch connector apparatus includes: a joining part configured to electrically join a plurality of connection lines to be connected to respective ones of a plurality of electrical devices; at least one fuse provided to correspond to at least one of the plurality of connection lines; a housing configured to accommodate the joining part and the at least one fuse; a connector to be coupled to a connector of the slot part, the connector including a terminal electrically connected to the joining part; and a guided part provided on an outer side surface of the housing. The guided part is guided along an extension direction of the guiding part by the guiding part.

According to the branch connector apparatus, when the branch connector apparatus is inserted into the slot part, the guided part is guided along the extension direction of the guiding part by the guiding part. In such a guided state, the connector is connected to the connector of the slot part. Thus, the branch connector apparatus is smoothly connected to the battery pack being a type of device.

Specific examples of a power supply apparatus and a branch connector apparatus according to the present disclosure will be described below with reference to the drawings. Note that the present disclosure is not limited to these examples. The present disclosure is defined by the scope of the claims, and is intended to include all modifications that fall within the scope of the claims and its equivalent meanings and scopes.

A power supply apparatus and a branch connector apparatus according to the first embodiment will be described below.

FIG. 1 is a block diagram illustrating an example in which a power supply apparatus 20 and a branch connector apparatus 40 are applied to a system of supplying power to a plurality of electrical devices 10. The power supply apparatus 20 and the branch connector apparatus 40 may be applied to, for example, an electric motor vehicle, a hybrid motor vehicle equipped with an electric motor and an internal combustion engine, or the like.

FIG. 1 illustrates a plurality of electrical devices 10 and a power supply apparatus 20. The electrical devices 10 are various electrical devices mounted on a motor vehicle, and operate by receiving DC power supply. The power supply apparatus 20 supplies power to the plurality of electrical devices 10. Each of the electrical devices 10 and the power supply apparatus 20 are connected via a pair of connection lines 12. As each of the connection lines 12, a covered electric wire including a core wire and a covering material that covers the core wire may be used.

The power supply apparatus 20 includes a battery pack 22 for a motor vehicle and a power interface part 30.

The battery pack 22 includes, for example, a battery 24 and a controller 26. The battery 24 is a battery that stores electric energy. The battery 24 can store power supplied from the outside. The power supplied from the outside may be power generated by a power generator mounted on the motor vehicle, or may be power supplied from the outside of the motor vehicle. The controller 26 performs charge and discharge control of the battery 24, for example. The battery 24 and the controller 26 may be handled as an integrated battery pack 22 in a state of being accommodated inside a case 28.

DC power from the battery 24 is supplied to the plurality of electrical devices 10 via the power interface part 30 and the connection lines 12. Specifically, the power interface part 30 is a part that serves as a power interface that connects the battery 24 and the plurality of electrical devices 10 in the battery pack 22.

Here, the power interface part 30 includes a battery-side connector 32 and a branch connector apparatus 40.

The battery-side connector 32 is a connector of a slot part 34 that is electrically connected to the battery 24 of the battery pack 22, and includes a positive (+) terminal and a negative (−) terminal.

The branch connector apparatus 40 is configured to be capable of being coupled to the battery-side connector 32. A plurality of pairs of connection lines 12 extend from the branch connector apparatus 40 toward respective ones of a plurality of electrical devices 10. Each connection line 12 of the plurality of pairs is electrically connected to a corresponding electrical device 10 via a connector of the device, for example. The power from the battery 24 is distributed in the branch connector apparatus 40 into a plurality of paths, so as to be supplied to each of the plurality of electrical devices 10 via the plurality of pairs of connection lines. Specifically, the branch connector apparatus 40 is configured to be capable of distributing and supplying the power from the battery 24 into the plurality of electrical devices 10 in a state in which the branch connector apparatus 40 is coupled to the battery-side connector 32.

Here, the battery pack 22 includes a slot part 34. The slot part 34 opens toward the outside, and allows the branch connector apparatus 40 to be inserted and extracted. In the slot part 34, the battery-side connector 32 is provided. When the branch connector apparatus 40 is inserted into the slot part 34, the branch connector apparatus 40 is coupled to the battery-side connector 32.

Branch Connector Apparatus

Figure 2:
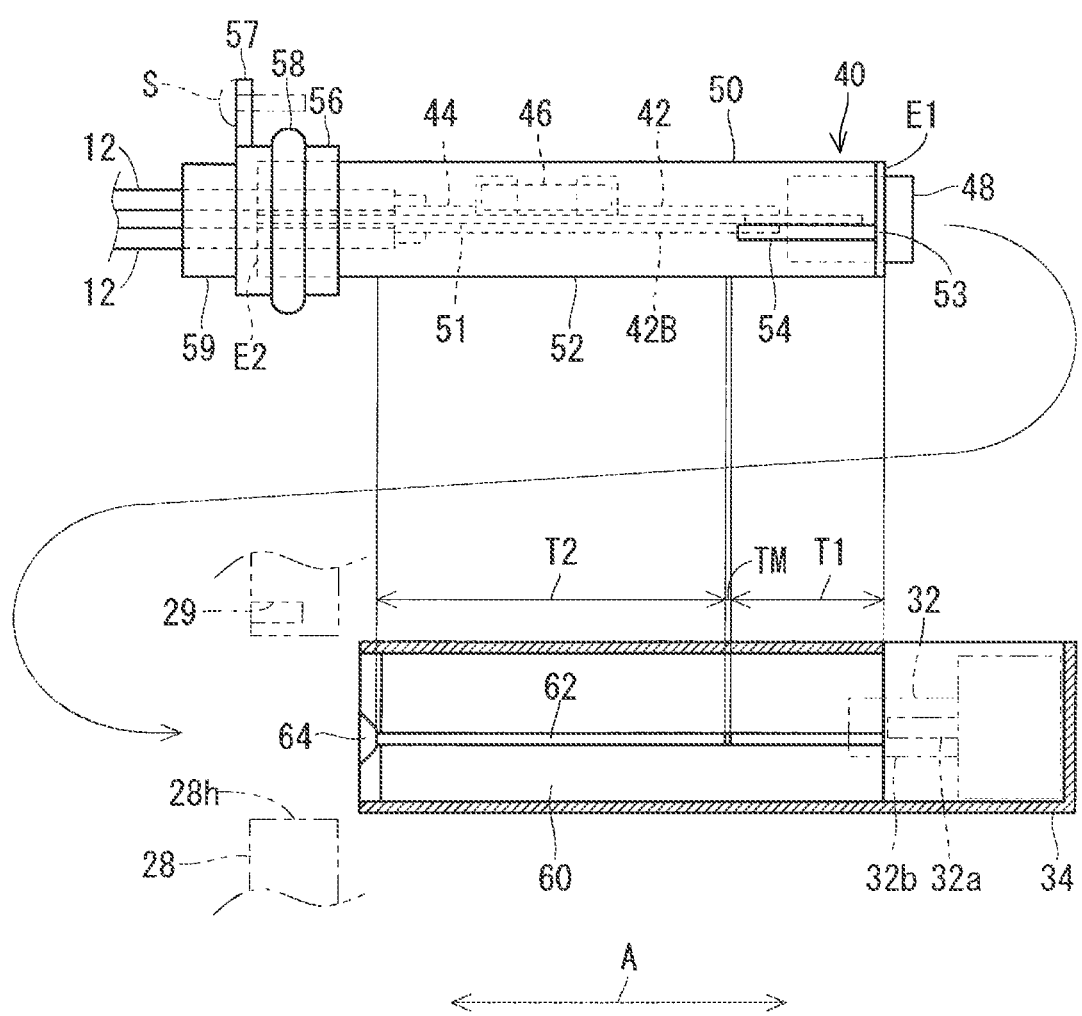
FIG. 2 is a side view illustrating the branch connector apparatus according to the first embodiment.
Figure 3:
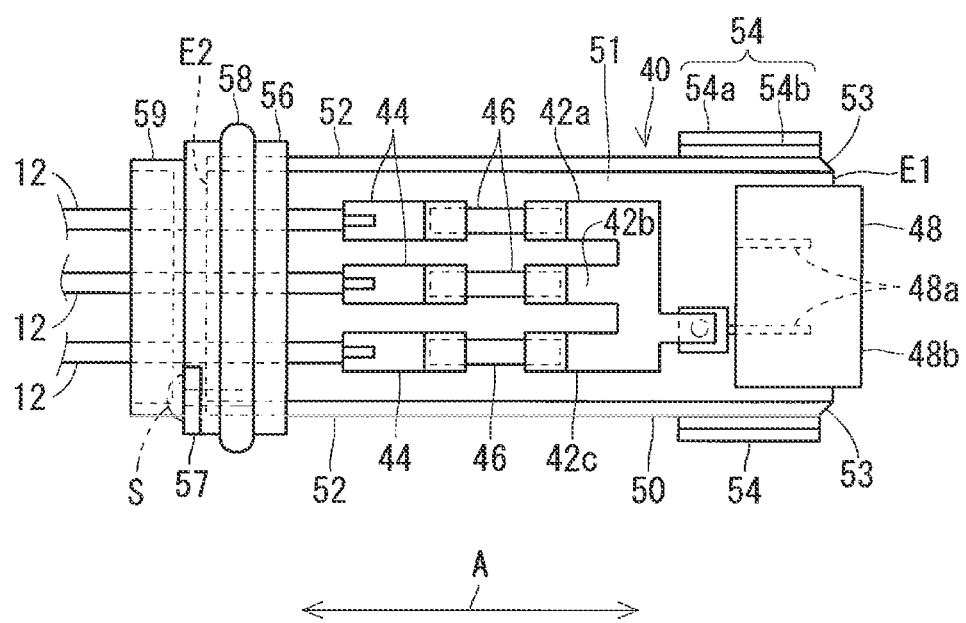
FIG. 3 is a plan view illustrating the branch connector apparatus.
Figure 4:
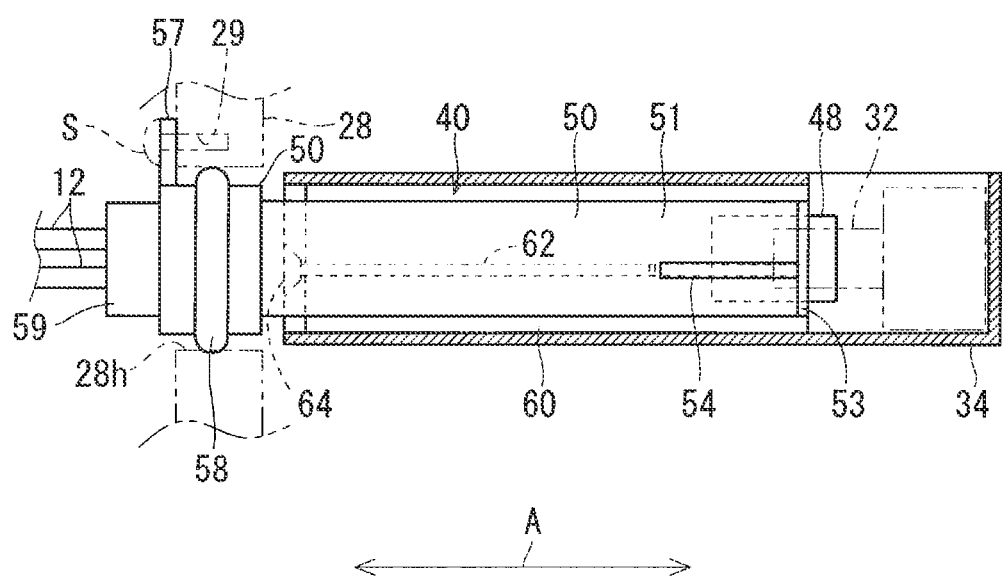
FIG. 4 is a side view illustrating the branch connector apparatus.

The branch connector apparatus 40 will be described in more detail. FIG. 2 is a side view illustrating the branch connector apparatus 40 before being inserted into the slot part 34. FIG. 3 is a plan view illustrating the branch connector apparatus 40. FIG. 4 is a side view illustrating the branch connector apparatus 40 in a state of being inserted into the slot part 34. FIG. 2 and FIG. 4 illustrate the slot part 34 in cross-section.

The branch connector apparatus 40 includes a joining part 42, a fuse 46, a housing 50, a connector 48, and a guided part 54. The branch connector apparatus 40 can be inserted into and extracted from the slot part 34. In the following description, a direction in which the branch connector apparatus 40 is inserted into or extracted from the slot part 34 may be referred to as an insertion and extraction direction A.

The housing 50 is a member made of an insulating material such as resin. The housing 50 is configured to accommodate the joining part 42 and the fuse 46 in such a manner that the joining part 42 and the fuse 46 are kept at fixed positions. Here, the housing 50 includes a substrate part 51 and a pair of side plate parts 52. The substrate part 51 is formed into a plate having a rectangular shape, here, a plate having an elongated rectangular shape. The pair of side plate parts 52 is formed into a plate having an elongated shape. The pair of side plate parts 52 is provided on both side portions of the substrate part 51, here, both side portions on the longer sides. Here, the side plate parts 52 are provided so as to project toward both surface sides of the substrate part 51. In this manner, an accommodation space surrounded by the substrate part 51 and the pair of side plate parts 52 is formed on both the surface sides of the substrate part 51. In the accommodation space, the joining part 42 and the fuse 46 are accommodated. As illustrated in the present example, the accommodation space may be a partially open space. As a matter of course, the housing may entirely surround the joining part 42 and the fuse 46.

The joining part 42 is a part that electrically joins the connection lines 12 to be connected to respective ones of the plurality of electrical devices 10. The joining part 42 is, for example, made of a metal plate such as a copper plate. The joining part 42 includes a plurality of (here, three) branch end portions 42a, 42b, and 42c and one joined end portion 42d. In a state in which the joining part 42 is disposed on one surface (upper surface in FIG. 2) of the substrate part 51, the joined end portion 42d faces an insertion direction of the insertion and extraction direction A, and the plurality of branch end portions 42a, 42b, and 42c face an extraction direction of the insertion and extraction direction A. The plurality of branch end portions 42a, 42b, and 42c are electrically connected to the connection lines 12 corresponding to the plurality of electrical devices 10. Further, the plurality of branch end portions 42a, 42b, and 42c are formed integrally with the joined end portion 42d and are electrically connected to the joined end portion 42d. Accordingly, the plurality of connection lines 12 connected to the respective ones of the plurality of electrical devices 10 are electrically joined in the joining part 42.

At least one fuse 46 is provided to correspond to at least one of the plurality of connection lines 12. For example, a plurality of fuses 46 are provided to correspond to respective ones of the plurality of branch end portions 42a, 42b, and 42c. The connection line 12 is electrically connected to any one of the plurality of branch end portions 42a, 42b, and 42c via the fuse 46. Here, the connection lines 12 corresponding to the plurality of electrical devices 10 are electrically and mechanically connected to relay parts 44 made of a metal plate or the like. Connection between each connection line 12 and each relay part 44 may be achieved with screw fastening, crimping, soldering, or the like. One end portion of the fuse 46 is electrically and mechanically connected to the relay part 44, and at the same time, another end portion of the fuse 46 is electrically and mechanically connected to one of the plurality of branch end portions 42a, 42b, and 42c. Connection between the end portion of the fuse 46 and the relay part 44 or between the end portion of the fuse 46 and the branch end portion 42a, 42b, or 42c may be achieved with, for example, a fitting structure or the like.

The joining part 42, the fuse 46, and the relay part 44 are fixed onto one surface of the substrate part 51. End portions of the connection lines 12 are electrically and mechanically connected to the relay parts 44 on one surface of the substrate part 51. In this manner, the connection lines 12 are connected from the relay parts 44 to the joining part 42 via the fuses 46 in the accommodation space of the housing 50. The plurality of connection lines 12 join into one in the joining part 42. From another perspective, the joined end portion 42d on the battery 24 side is distributed into the plurality of branch end portions 42a, 42b, and 42c in the joining part 42, and is connected from the plurality of branch end portions 42a, 42b, and 42c to the connection lines 12 via the fuses 46.

The joining part 42 and the relay part 44 may be fixed to the housing with screw fastening or the like, or may be fixed to the housing by being fitted into a recessed portion formed in the housing.

The connector 48 includes terminals 48a and a connector housing 48b. Each terminal 48a is an elongated metal part electrically connected to the joining part 42. Each terminal 48a may be, for example, electrically and mechanically fixed to the joined end portion 42d in the joining part 42 with screw fastening, welding, or the like, or may be a part formed integrally with the joined end portion 42d. The connector housing 48b is a member made of resin or the like. The connector housing 48b is supported at a portion on the depth side in the insertion direction of the insertion and extraction direction A with respect to the housing 50. The connector housing 48b may be supported with respect to the housing 50 by a fitting structure, or may be fixed with screw fastening or the like. Here, the connector housing 48b is located at a position between both the side plate parts 52 in the housing 50 and on the depth side in the insertion direction of the insertion and extraction direction A with respect to the joining part 42. The connector housing 48b is formed into such a tubular shape that closes on the joining part 42 side and opens on the external side. The terminals 48a are embedded in a closed bottom portion in the connector housing 48b. The terminals 48a extend outwardly from the bottom portion of the connector housing 48b, and are connected to the joined end portion 42d of the joining part 42.

Note that the above example mainly gives description of one polarity (for example, the positive (+) pole) of a power supply path from the battery 24 to the electrical devices 10. As for the other polarity (for example, the negative (−) pole), for example, the following configuration may be adopted: In comparison to the above configuration, the fuses 46 and the relay parts 44 are omitted, and the connection lines 12 are directly electrically and mechanically connected to a joining part 42B corresponding to the joining part 42. Note that it is only necessary that the fuses 46 be provided on either polarity side in the power supply path from the battery 24 to the electrical devices 10. The fuse 46 need not necessarily be provided to correspond to each single electrical device 10. It is only necessary that at least one fuse be provided in the branch connector apparatus 40.

Here, the battery-side connector 32 on the slot part 34 side includes a terminal 32a and a battery-side connector housing 32b. The terminal 32a is formed into a shape connectable to the terminals 48a. The terminal 32a is connected to the battery 24, and has positive (+) or negative (−) polarity. For example, when each terminal 48a has a pin-like or tab-like shape, the terminal 32a is formed into such a tubular shape that allows the terminals 48a to be inserted. The battery-side connector housing 32b is made of resin or the like, and is formed into a shape fittable to the connector housing 48b. The terminal 32a is held inside the battery-side connector housing 32b. The battery-side connector 32 is supported at a position facing the connector 48 in the slot part 34, here, a position on the depth side in the slot part 34. Note that the relationship of recesses and projections (specifically, a relation as to which is to be inserted and which is to insert) in the connector housing 48b, the battery-side connector housing 32b, and the terminals 48a and 32a may be the opposite.

When the branch connector apparatus 40 is inserted into the slot part 34, the connector 48 is coupled to the battery-side connector 32. In this state, the terminal 32a of the battery-side connector 32 is connected to the terminals 48a of the branch connector apparatus 40. Consequently, each electrical device 10 is electrically connected to the battery 24 via the connection lines 12, the relay parts 44, the fuses 46, the joining part 42, the connector 48, and the battery-side connector 32.

Guiding Structure of Branch Connector Apparatus

It is assumed that the operation of inserting the branch connector apparatus 40 into the slot part 34 is performed in a state in which an end portion of the branch connector apparatus 40 on the front side in the insertion direction along the insertion and extraction direction A is held by an operator or the like. In this case, the connector 48 is located away from such a held position approximately by a dimension of the housing 50 in the insertion and extraction direction A, which may make it difficult to perform the operation of adjusting the position of the connector 48 to couple the connector 48 to the battery-side connector 32.

In particular, in the present example, the fuses 46, the joining part 42, and the connector 48 are disposed to align along the insertion and extraction direction A, with respect to the housing 50. Thus, the branch connector apparatus 40 tends to have a shape elongated along the insertion and extraction direction A. Further, the connector 48 is provided on the depth side in the insertion direction along the insertion and extraction direction A. This may make the operation of adjusting the position of the connector 48 further difficult.

In order that the branch connector apparatus 40 be smoothly connected to the battery pack 22, the following configuration is herein adopted.

Specifically, the guided parts 54 are provided on outer side surfaces of the housing 50. Here, description is given by taking an example in which each guided part 54 is an elongated projection portion. Further, here, a pair of guided parts 54 are provided on both outer side surfaces of the housing 50, specifically, outer surfaces of both the side plate parts 52. Only a single guided part 54 may be provided in the housing 50.

The slot part 34 is made of resin or the like, and is formed into such a tubular shape that allows the branch connector apparatus 40 to be inserted. The slot part 34 is accommodated in the case 28. An opening 28h is formed in a part of the case 28 of the battery pack 22 where the slot part 34 is provided. One end portion of the slot part 34 is opened. The opening of the slot part 34 faces outward through the opening 28h of the case 28. Another end portion of the slot part 34 may be opened, or may be closed. The battery-side connector 32 is supported on the depth side of the slot part 34.

Guiding parts 62 are provided at portions of an inner side surface of the slot part 34 facing the guided parts 54. Here, a pair of guiding plate parts 60 are provided in both side portions of the inner side surface of the slot part 34 facing the pair of guided parts 54. One guiding part 62 is formed in each of the pair of guiding plate parts 60. The slot part 34 and the guiding plate parts 60 are provided as separate bodies, and accordingly there are fewer limitations on shapes when the guiding parts 62 are molded. The guiding parts 62 may be directly formed on inner portions of the slot part 34. Each guiding part 62 is formed into a shape extending along the insertion and extraction direction A of the branch connector apparatus 40 with respect to the slot part 34. Here, each guiding part 62 is elongated along the insertion and extraction direction A. An elongated shape refers to such a shape that a dimension in one direction is longer than a dimension in another direction that is perpendicular to the mentioned one direction. Here, each guiding part 62 is formed into such a shape that a dimension in the insertion and extraction direction A is larger than a dimension in a direction that is perpendicular to both of the insertion and extraction direction A and a projection direction of the guiding parts 62.

When the branch connector apparatus 40 is inserted into the slot part 34, the guided parts 54 are guided along an extension direction of the guiding parts 62 (that is, the insertion and extraction direction A) by the guiding parts 62.

Figure 5:
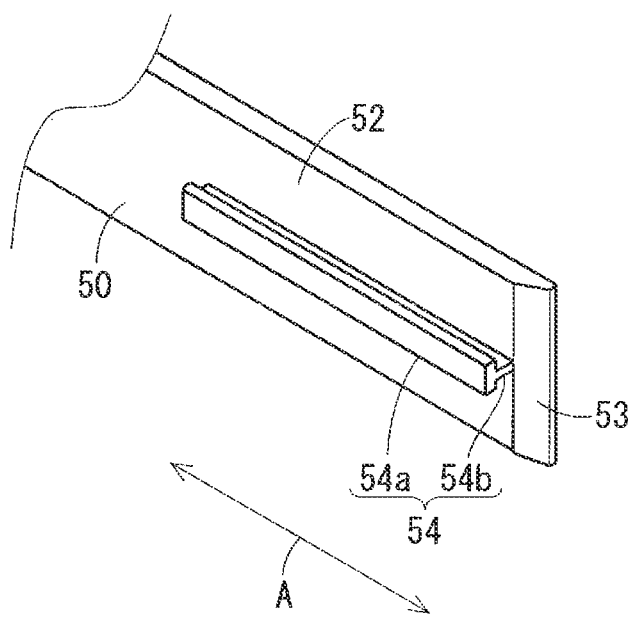
FIG. 5 is a perspective view illustrating a guided part.

More detailed description will be given. FIG. 5 is a perspective view illustrating the guided part 54. FIG. 5 illustrates only a part of one side plate part 52 and one guided part 54. As illustrated in FIG. 2 to FIG. 4, the housing 50 has a shape elongated along the insertion and extraction direction A. Here, each guided part 54 is formed at an intermediate portion of each side plate part 52 in the width direction. The guided part 54 may be formed along at least one edge of the side plate part 52. Further, the guided part 54 is formed into such a shape that the width of a portion thereof on a distal end side in the projection direction is larger than the width of a portion thereof on a base end side. In other words, a horizontal cross-sectional shape of the guided part 54 (a cross-sectional shape of the guided part 54 in a direction perpendicular to its extension direction) has a T-like shape with its width being smaller on the base end side. In the following description, the portion of the guided part 54 on the distal end side having a larger width in the projection direction may be referred to as a guided main body portion 54a, and the portion thereof on the base end side having a smaller width as a guided base portion 54b. Such a shape of the guided part 54 is a shape that does not let the guided part 54 easily come off the guiding part 62 (described later) in a state in which the guided part 54 is fitted into the guiding part 62.

An end portion of the housing 50 closer to the battery-side connector 32 along the insertion and extraction direction A is defined as a first end portion E1, and an end portion thereof farther from the battery-side connector 32 than the first end portion E1 is defined as a second end portion E2. In the insertion and extraction direction A, the guided parts 54 are disposed at positions close to the first end portion E1, specifically, positions closer to the first end portion E1 than the second end portion E2. Here, the guided parts 54 are formed to be adjacent to respective edge portions of the side plate parts 52 on the insertion side across a first leading part 53 (described below) along the insertion and extraction direction A. Thus, when the branch connector apparatus 40 is inserted into the slot part 34, the guided parts 54 are guided by the guiding parts 62 at an initial stage.

The housing 50 includes the first leading part 53 that leads the guided parts 54 into the guiding parts 62. Here, the first leading part 53 is formed at an end portion of an external part of the side plate part 52 on the insertion side along the insertion and extraction direction A (the first end portion E1 side in the housing 50). Here, the first leading part 53 is formed into such an inclined shape that gradually tapers inwardly toward a direction in which the branch connector apparatus 40 is inserted into the slot part 34. The guided part 54 is formed continuously to the first leading part on an opposite side of the first end portion E1 in the insertion and extraction direction A. Thus, when the branch connector apparatus 40 is inserted into the slot part 34 and both side portions of a tip end portion of the housing 50 come into contact with the opening of the slot part 34, inner portions of the opening of the slot part 34, specifically, portions where the guiding parts 62 are formed, come into contact with the first leading part 53. In this case, due to such a contact between the inner portions of the opening of the slot part 34 and the first leading part 53, the housing 50 is guided toward a space inside the slot part 34, and the guided parts 54 are also led into the guiding parts 62.

Figure 6:
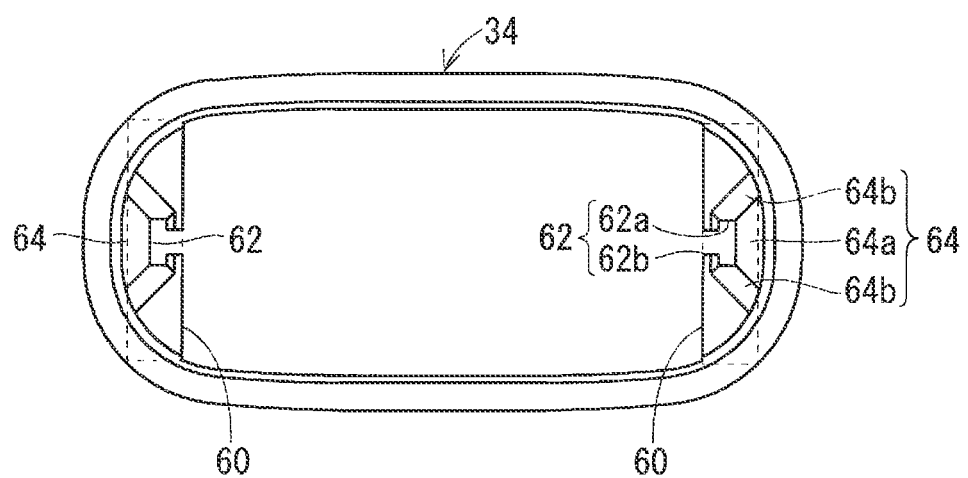
FIG. 6 is a front view of a slot part as seen from an opening side.
Figure 7:
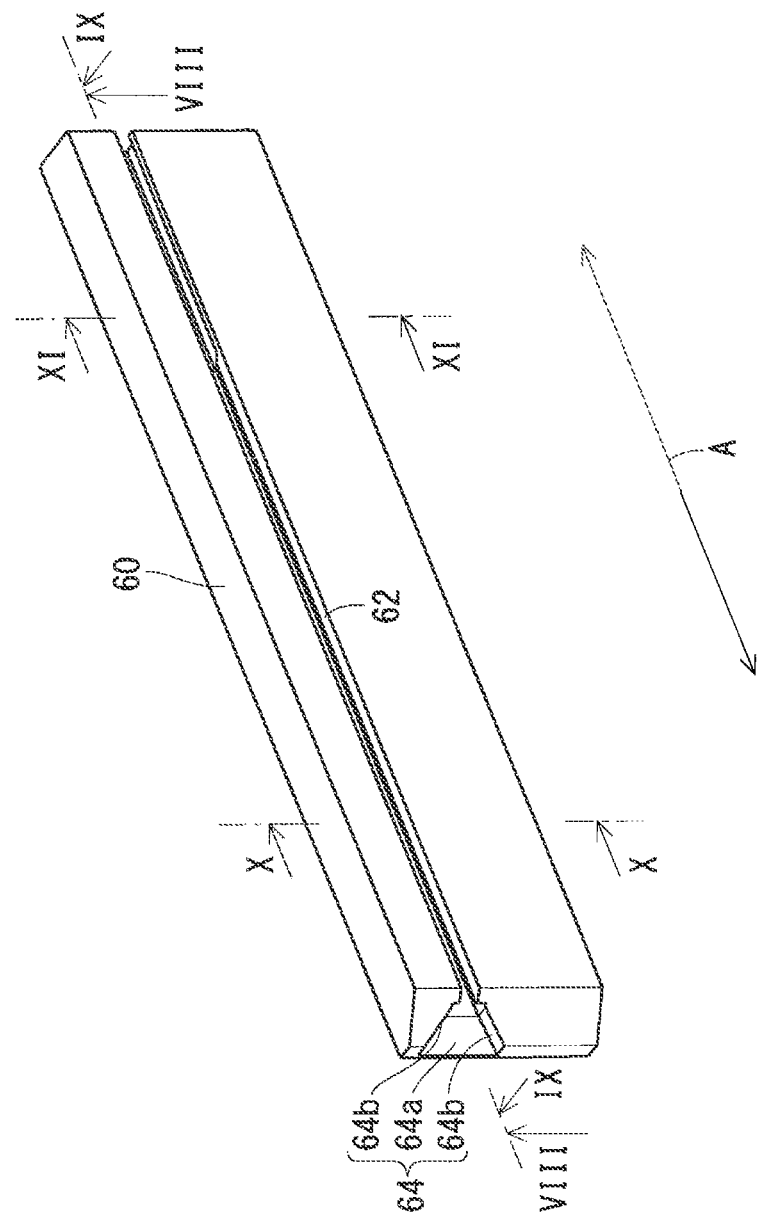
FIG. 7 is a perspective view illustrating one guiding plate part.
Figure 8:
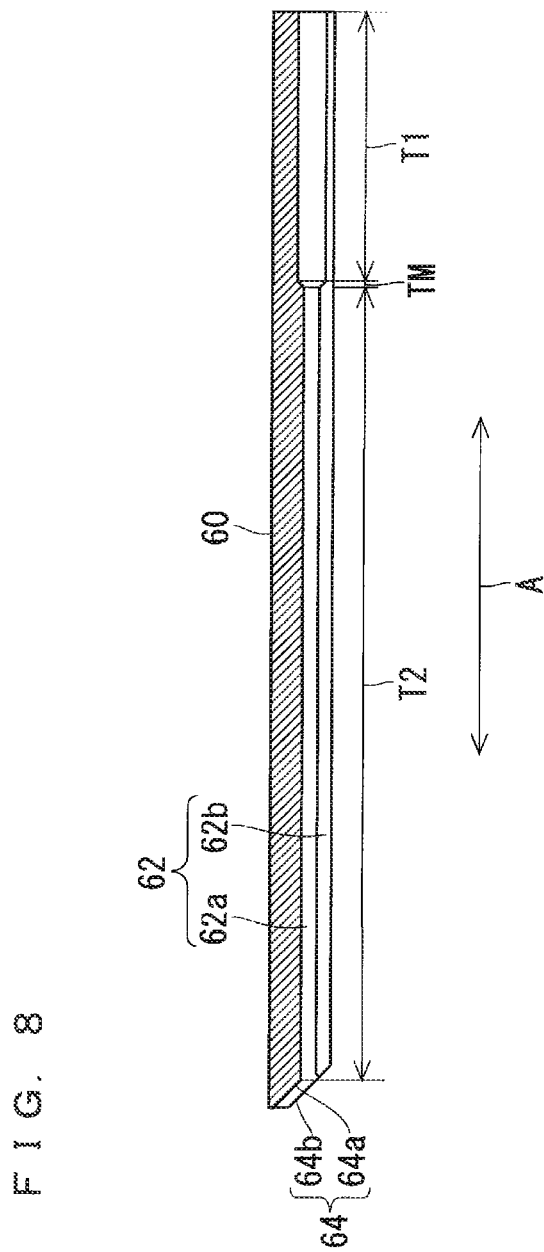
FIG. 8 is a cross-sectional view taken along the line VIII-VIII of FIG. 7.
Figure 9:
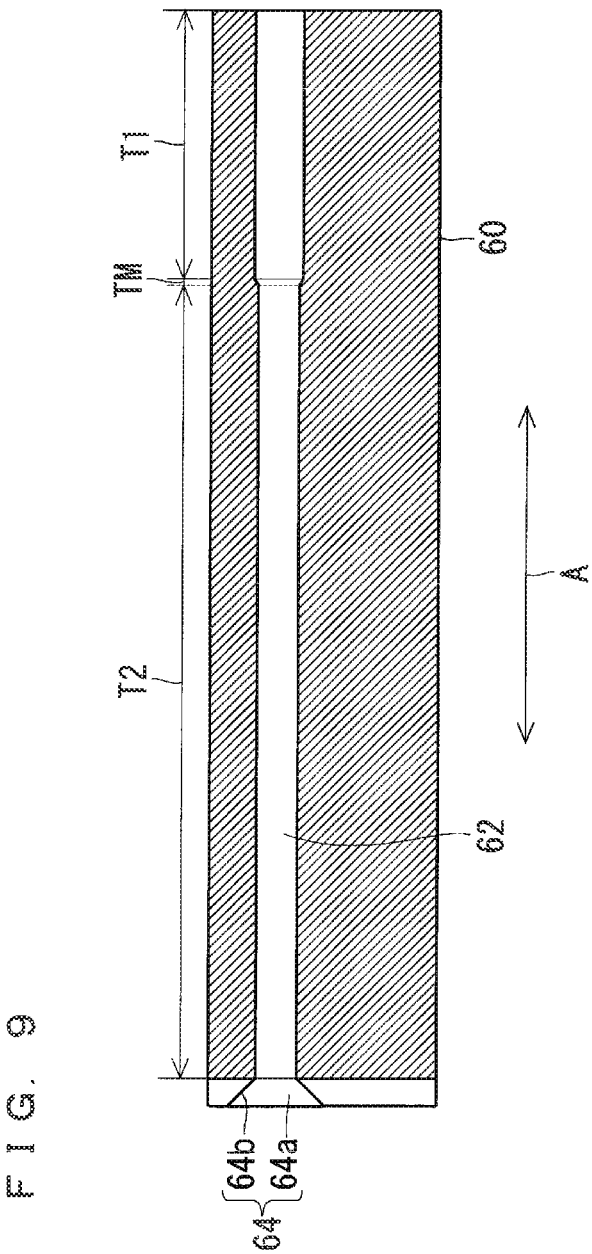
FIG. 9 is a cross-sectional view taken along the line IX-IX of FIG. 7.
Figure 10:
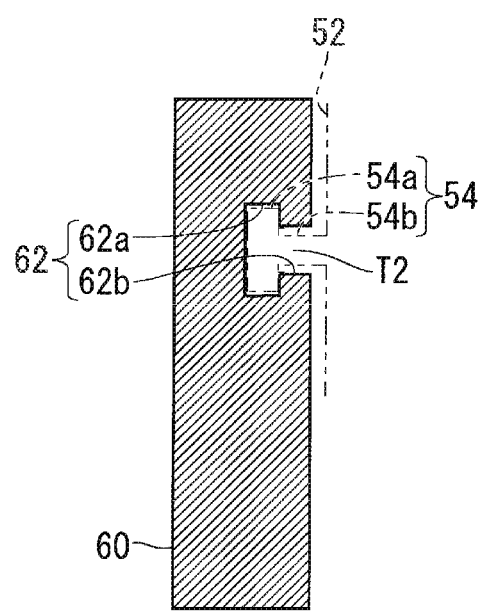
FIG. 10 is cross-sectional view taken along the line X-X of FIG. 7.
Figure 11:
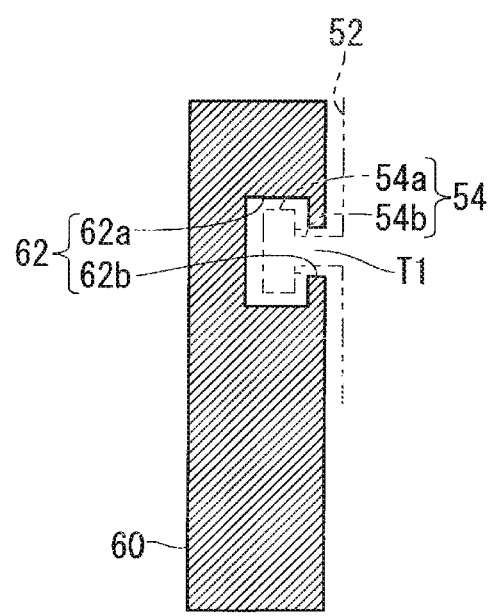
FIG. 11 is a cross-sectional view taken along the line XI-XI of FIG. 7.

FIG. 6 is a front view of the slot part 34 as seen from the opening side. FIG. 7 is a perspective view illustrating one guiding plate part 60. FIG. 8 is a cross-sectional view taken along the line VIII-VIII of FIG. 7. FIG. 9 is a cross-sectional view taken along the line IX-IX of FIG. 7. FIG. 10 is a cross-sectional view taken along the line X-X of FIG. 7. FIG. 11 is a cross-sectional view taken along the line XI-XI of FIG. 7. In FIG. 10 and FIG. 11, a part of the side plate part 52 and the guided part 54 are indicated by the two-dot chain line.

Each guiding plate part 60 is formed into an elongated plate-like shape disposed along one side portion inside the slot part 34. In an intermediate portion of an inner side surface of each guiding plate part 60 in the width direction, one guiding part 62 having an elongated shape and extending along an extension direction of the guiding plate part 60 is formed.

Here, the guiding part 62 is formed into a groove shape extending along the insertion and extraction direction A. More specifically, the guiding part 62 is formed into such a groove shape that the width on the depth side is larger than an opening width. In other words, a horizontal cross-sectional shape of the guiding part 62 (a cross-sectional shape of the guiding part 62 perpendicular to its extension direction) is formed into such a shape as to form a T-like space with its width larger on the depth side. In the following description, the portion of the guiding part 62 on the depth side having a larger width may be referred to as a guiding groove main body 62a, and the portion thereof on the opening side having a smaller width as a guiding groove opening portion 62b.

The width dimension and the thickness dimension of the guided main body portion 54a are smaller than the width dimension and the depth dimension of the guiding groove main body 62a (dimension of the guiding part 62 being a groove in the depth direction). Further, the width dimension of the guided base portion 54b of the guided part 54 is smaller than the width dimension of the guiding groove opening portion 62b, and the projection dimension of the guided base portion 54b is larger than the depth dimension of the guiding groove opening portion 62b (dimension of the guiding part 62 being a groove in the depth direction). Thus, the guided part 54 can be moved inside the guiding part 62 in a state of being guided along the insertion and extraction direction A.

Further, it is preferable that the width dimension of the guided main body portion 54a be larger than the width dimension of the guiding groove opening portion 62b. In this case, the guided main body portion 54a is inserted into the guiding groove opening portion 62b through the opening on its end portion side in the extension direction. Though being inserted in this manner, the guided main body portion 54a does not easily come off in a direction toward the guiding groove opening portion 62b.

Unlike the above description, each guided part 54 need not necessarily have a T-like shape in horizontal cross-section, and each guiding part 62 need not necessarily be a T-like groove in horizontal cross-section. Even when the guided part is an elongated rectangular projection in horizontal cross-section and the guiding part has a rectangular groove shape in horizontal cross-section, the guided part is guided as a result of a contact being made with the bottom and both the side surfaces of the groove.

The guiding part 62 includes, in the insertion and extraction direction A, a first area T1, and a second area T2 that is farther from the battery-side connector 32 than the first area T1. The guided part 54 is moved into the first area T1 through the second area T2.

In a direction perpendicular to the extension direction of the guiding part 62 (direction perpendicular to the insertion and extraction direction A), a clearance allowing movement of the guided part 54 with respect to the guiding part 62 is set to be larger in the first area T1 than in the second area T2 (see FIG. 10 and FIG. 11).

The present embodiment presents a configuration that the guided part 54 being a projection is moved inside the guiding part 62 being a groove. Thus, the dimensions of the first area T1 of the guiding part 62 in horizontal cross-section (that is, the dimensions of the groove) are larger than the dimensions of the second area T2 of the guiding part 62 in horizontal cross-section (that is, the dimensions of the groove). With this configuration, the clearance allowing movement of the guided part 54 with respect to the guiding part 62 is larger in the first area T1 than in the second area T2. Thus, the guided part 54 is more accurately guided in the second area T2 of the guiding part 62 than in the first area T1. When the guided part 54 is moved into the first area T1 of the guiding part 62, the guided part 54 is guided with a larger margin being provided than that in the second area T2.

The clearance allowing movement of the guided part 54 with respect to the guiding part 62 may be larger in any direction among directions perpendicular to the insertion and extraction direction A. For example, the clearance allowing movement of the guided part 54 with respect to the guiding part 62 in a first direction perpendicular to the insertion and extraction direction A may be larger in the first area T1 than in the second area T2. The first direction in this case may be the width direction of the guided part 54, or may be the projection direction of the guided part 54. In other words, one of the width dimension and the depth dimension of the guiding groove main body 62a may be larger in the first area T1 than in the second area T2.

Further, for example, in a second direction perpendicular to both the insertion and extraction direction A and the first direction as well, the clearance allowing movement of the guided part 54 with respect to the guiding part 62 may be larger in the first area T1 than in the second area T2. In other words, both of the width dimension and the depth dimension of the guiding groove main body 62a may be larger in the first area T1 than in the second area T2.

Note that the width dimension of the guiding groove opening portion 62b may be set to be larger than the width of the guided base portion 54b to the extent of not hampering the movement of the guided main body portion 54a using the clearance inside the guiding groove main body 62a. Further, the depth dimension of the guiding groove opening portion 62b may be set to be smaller than the projection dimension of the guided base portion 54b to a similar extent.

In the present embodiment, for the guiding part 62, an intermediate area TM is provided between the first area T1 and the second area T2. The intermediate area TM includes a guiding surface that gradually extends an inner surface of the guiding groove main body 62a of the guiding part 62 from the second area T2 toward the first area T1. This configuration allows the guided main body portion 54a of the guided part 54 to be smoothly moved from the second area T2 to the first area T1 while coming into contact with the guiding surface of the intermediate area TM.

It is preferable that the length dimension of the guided part 54 in the insertion and extraction direction A be smaller than the length dimension of the first area T1. This configuration allows the entire guided part 54 to be accommodated in a part within the first area T1 of the guiding part 62, thus allowing the branch connector apparatus 40 to be freely moved with respect to the slot part 34 in a certain degree in a state in which the branch connector apparatus 40 is deeply inserted into the slot part 34.

The slot part 34 may be provided with a second leading part 64 that leads the guided part 54 into the guiding part 62. Here, the second leading part 64 is provided in the guiding plate part 60.

More specifically, the second leading part 64 is provided at an end portion of the guiding plate part 60 on a side away from the battery-side connector 32. The second leading part 64 is provided continuously to the guiding part 62 on the side away from the battery-side connector 32.

More specifically, an end portion of an inward portion of the guiding plate part 60 on the side away from the battery-side connector 32 is formed into such a shape as a guiding surface that gradually tapers inwardly toward a direction in which the branch connector apparatus 40 is inserted. The guiding part 62 is opened in the guiding surface. The second leading part 64 is formed in the guiding surface.

The second leading part 64 includes a bottom surface 64a and a pair of side surfaces 64b. The bottom surface 64a is formed continuously to a surface of the guiding groove main body 62a of the guiding part 62 on the depth side. The bottom surface 64a is formed into such a shape that expands outwardly toward a direction away from the battery-side connector 32 in the insertion and extraction direction A. The pair of side surfaces 64b is formed continuously to the pair of side surfaces of the guiding groove main body 62a of the guiding part 62. The pair of side surfaces 64b is formed into such a shape that expands outwardly toward a direction away from the battery-side connector 32 in the insertion and extraction direction A. In other words, the second leading part 64 is a groove that is formed continuously to the guiding part 62 on an opposite side of the battery-side connector 32 and that gradually expands toward the opposite side.

When the guided part 54 projecting on each lateral side of the housing 50 is inserted into the second leading part 64, the guided part 54 comes into contact to the bottom surface 64a and the pair of side surfaces 64b of the second leading part 64 and is thereby guided toward the guiding part 62.

Water Blocking Structure of Branch Connector Apparatus

The present embodiment presents a configuration that the guiding part 62 is provided inside the slot part 34, and the guided part 54 of the branch connector apparatus 40 is fitted into the guiding part 62 so as to be guided. This necessitates a fitting structure including recesses and projections between the branch connector apparatus 40 and the slot part 34, making it difficult to provide a water blocking structure between the branch connector apparatus 40 and the slot part 34. In view of this, the present embodiment adopts the following configuration.

First, the branch connector apparatus 40 includes a tubular part 56 and a water blocking member 58 (see FIG. 2 to FIG. 4).

The tubular part 56 is a part made of resin or metal, for example, and is formed into a tubular shape surrounding a part of an outer side surface of the housing 50. Here, the tubular part 56 is formed into a tubular shape covering a part of the housing 50 on the second end portion E2 side. Note that a rubber plug part 59 made of an elastic material such as rubber is provided in the tubular part 56. The connection lines 12 are led out of the tubular part 56 through a through hole formed in the rubber plug part 59. In a state in which the branch connector apparatus 40 is inserted into the slot part 34 and the connector 48 is connected to the battery-side connector 32, the tubular part 56 is located at a position outside the slot part 34. In the case 28, the opening 28h allowing the internal space of the slot part 34 to communicate with an outer space of the battery pack 22 is provided. The opening 28h is located outside the opening of the slot part 34. Thus, the opening 28h is disposed at a position farther from the battery-side connector 32 than the guiding part 62 in the insertion and extraction direction A.

The water blocking member 58 is an annular member made of an elastic material such as rubber. The water blocking member 58 is provided on an outer side surface of the tubular part 56. It is preferable that an annular groove be formed in an outer portion of the tubular part 56, and the water blocking member 58 be fitted into the annular groove.

In a state in which the branch connector apparatus 40 is inserted into the slot part 34, the water blocking member 58 comes into contact with an inner side surface of the opening 28h until the connector 48 and the battery-side connector 32 are coupled. It is preferable that the water blocking member 58 be present between the opening 28h and the tubular part 56 in a compressed state. This configuration allows the water blocking member 58 to block water between the case 28 and the branch connector apparatus 40.

Note that, here, a screw fastening part 57 projects from a part of an outer portion of the tubular part 56. A screw S is inserted into the screw fastening part 57, and the screw S is tightened in a screw hole 29 formed in the case 28.

When the screw S is tightened in the screw hole 29, a force causing the branch connector apparatus 40 to be inserted into the slot part 34 acts as a result of the tightening of the screw. The connector 48 may be coupled to the battery-side connector 32 with the force.

In this case, the screw S is tightened in the screw hole 29, and thus the branch connector apparatus 40 can be moved toward the battery-side connector 32 in a state of being guided with respect to the case 28, the slot part 34, and the battery-side connector 32 in a certain degree. It is preferable that such a positional relationship exist that the guided part 54 is disposed in the first area T1 of the guiding part 62 when the screw S starts being engaged with the screw hole 29. In this manner, the connector 48 is coupled to the battery-side connector 32 owing to the force of forward movement and the guiding action generated when the screw S is tightened in the screw hole 29.

Effects of Embodiments

According to the power supply apparatus 20 and the branch connector apparatus 40 of the present embodiment, when the branch connector apparatus 40 is inserted into the slot part 34, the guided part 54 is guided along the extension direction of the guiding part 62 by the guiding part 62. Further, the connector 48 is connected to the battery-side connector 32. Thus, the branch connector apparatus 40 is smoothly connected to the battery pack 22 being a type of device.

When the fuse 46, the joining part 42, and the connector 48 are disposed along the insertion and extraction direction A in particular, the branch connector apparatus 40 tends to be elongated along the insertion and extraction direction A. In such a case, with the guiding part 62 guiding the guided part 54, the guided part 54 is guided to a position that allows the guided part 54 to be easily coupled to the battery pack 22 even in a state in which the connector 48 deeply enters the slot part 34 in a certain degree. Consequently, the branch connector apparatus 40 is smoothly connected to the battery-side connector 32.

Further, the guided part 54 is disposed close to the first end portion E1 on the battery-side connector 32 side in the insertion and extraction direction A, with respect to the housing 50. This can advance timing for the guiding part 62 to start guiding of the guided part 54. Consequently, the branch connector apparatus 40 is less liable to be caught inside the slot part 34, for example, and the branch connector apparatus 40 is smoothly connected to the battery pack 22.

Further, the first leading part 53 is provided in the housing 50. Thus, when the opening portion of the slot part 34 comes into contact with the second leading part 64, the guided part 54 is led into the guiding part 62. For example, the branch connector apparatus 40 may be induced to enter the slot part 34 in a state in which the branch connector apparatus 40 is inclined or in a state in which the center of the branch connector apparatus 40 and the center of the slot part 34 are misaligned. In this case, however, the housing 50 comes into contact with the first leading part 53, correcting the orientation and the position of the branch connector apparatus 40, so that the guided part 54 is smoothly guided into the guiding part 62.

Further, the guided part 54 of the branch connector apparatus 40 first passes through the second area T2 and then reaches the first area. The clearance allowing movement of the guided part 54 with respect to the guiding part 62 in the direction perpendicular to the extension direction of the guiding part 62 is larger in the first area T1 than in the second area T2. Thus, when the branch connector apparatus 40 is deeply inserted, a higher degree of freedom is provided for the branch connector apparatus 40. Specifically, in an initial state shortly after the branch connector apparatus 40 is inserted, priority is given to guiding accuracy of the branch connector apparatus 40. In a later state after the branch connector apparatus 40 is inserted in a certain degree, priority shifts to absorbing a tolerance for the sake of coupling between the connector 48 and the battery-side connector 32. Accordingly, the connector 48 and the battery-side connector 32 can be smoothly coupled while guiding the branch connector apparatus 40. Further, in a state in which the connector 48 and the battery-side connector 32 are coupled, a stress acting on the guided part 54 and the guiding part 62 is relieved, which allows for enhancement of durability of the slot part 34 and the branch connector apparatus 40.

When the branch connector apparatus 40 is deeply inserted, a higher degree of freedom is provided for the branch connector apparatus 40 in the first direction perpendicular to the insertion and extraction direction A. Accordingly, priority shifts from guiding to absorbing a tolerance for the sake of coupling to the battery-side connector 32. Consequently, the connector 48 and the battery-side connector 32 are smoothly coupled while guiding the branch connector apparatus 40.

In particular, when a higher degree of freedom is provided for the branch connector apparatus 40 in the first direction and the second direction perpendicular to the insertion and extraction direction A, the connector 48 and the battery-side connector 32 are more effectively smoothly coupled while guiding the branch connector apparatus 40.

Further, when the guided part 54 is shorter than the first area T1, an even higher degree of freedom is securely provided for the branch connector apparatus 40 in a state in which the guided part 54 is located within the first area T1. Consequently, the connector 48 and the battery-side connector 32 can be smoothly coupled.

Further, when the second leading part 64 is provided on the slot part 34 side, the guided part 54 is led into the guiding part 62 by the second leading part 64. Thus, the guided part 54 is smoothly guided by the guiding part 62.

Further, the water blocking member 58 is provided in the tubular part 56 of the branch connector apparatus 40. With the water blocking member 58 coming into contact with the inner side surface of the opening 28h of the case 28, water is blocked between the case 28 and the branch connector apparatus 40. In this manner, water is collectively blocked from entering the connector 48, the joining part 42, the fuse 46, etc. at the same time as when the branch connector apparatus 40 is inserted into the slot part 34 to be coupled to the battery-side connector 32. This eliminates the necessity of providing a water blocking structure individually for the coupling portions of the connector 48, the joining part 42, etc., allowing for provision of a water blocking structure using a small number of components.

Second Embodiment

Figure 12:
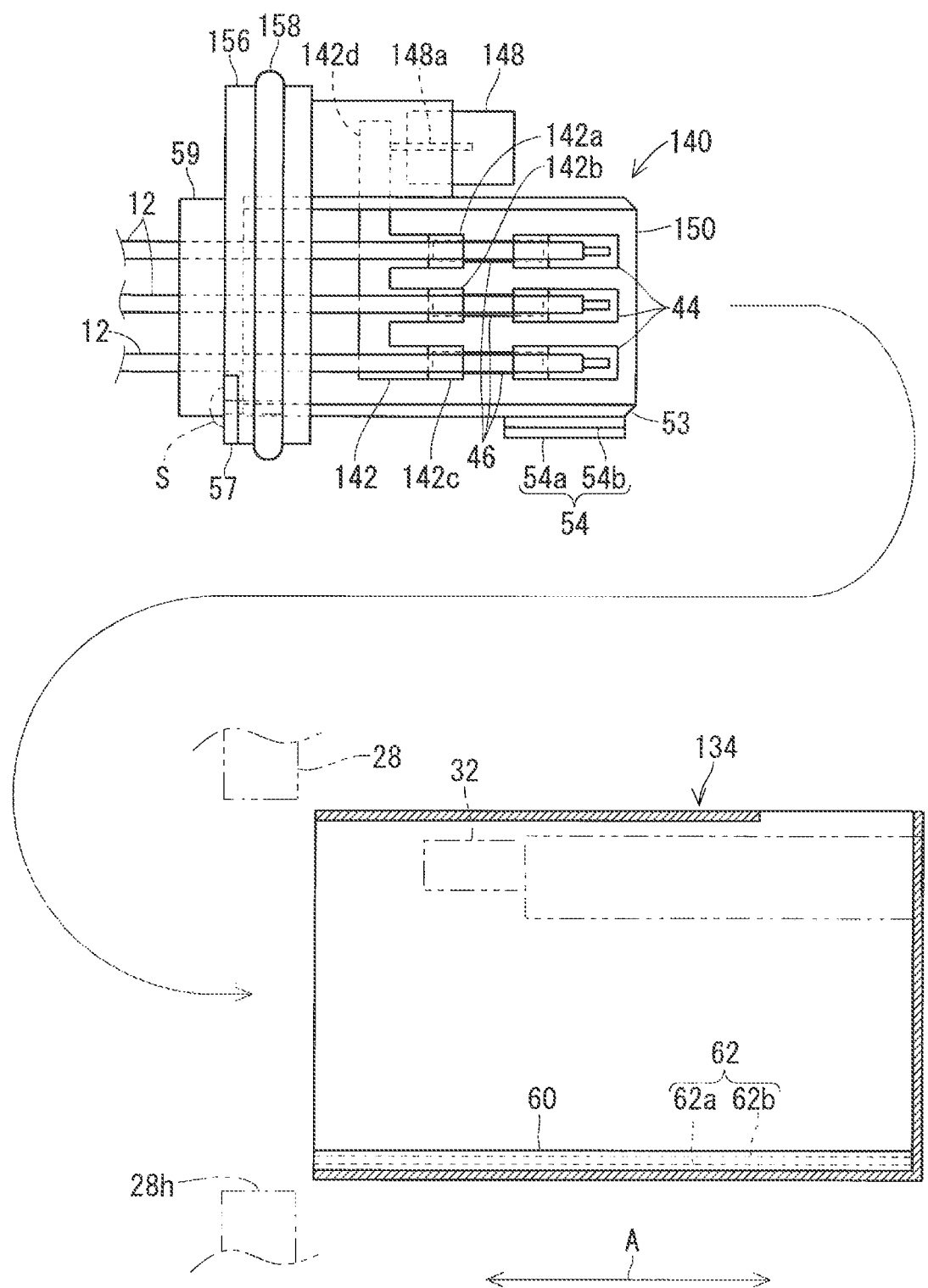
FIG. 12 is a plan view illustrating a branch connector apparatus according to the second embodiment.

A power supply apparatus and a branch connector apparatus 140 according to the second embodiment will be described. Note that, in the description of the second embodiment, components similar to those described in the first embodiment are denoted by the same reference signs, and description thereof will be omitted. FIG. 12 is a plan view illustrating a branch connector apparatus 140 before being inserted into a slot part 134.

The branch connector apparatus 140 is different from the branch connector apparatus 40 in the following respects.

First, a connector 148 corresponding to the connector 48 is provided at one side portion of a housing 150 corresponding to the housing 50. Accordingly, the guided part 54 is not provided at the one side portion of the housing 150, and is provided only at another side portion. Since the connector 148 is provided at the one side portion of the housing 150, the branch connector apparatus 140 has a smaller length and a larger width than the branch connector apparatus 40 according to the first embodiment.

The connector 148 is disposed on a further front side of the branch connector apparatus 140 in the insertion direction than the guided part 54. Note that, the front side of the branch connector apparatus 140 in the insertion direction is the opposite side of the depth side in the insertion direction along the insertion and extraction direction A. Thus, when the branch connector apparatus 140 is inserted into the slot part 134, the guided part 54 is guided by the guiding part 62 as early as possible.

Further, the relay parts 44 are provided on the depth side in the insertion direction with respect to the housing 150, and a joining part 142 corresponding to the joining part 42 is provided on a further front side in the insertion direction than the relay parts 44 with respect to the housing 150. A plurality of branch end portions 142a, 142b, and 142c of the joining part 142 are electrically connected to the relay parts 44 via the fuses 46, similarly to the first embodiment. A joined end portion 142d of the joining part 142 is led out of one lateral side of the housing 150, and is electrically and mechanically connected to a terminal 148a of the connector 148.

Further, a tubular part 156 corresponding to the tubular part 56 is formed into such a tubular shape as to cover rear portions of the housing 150 and the connector 148. A water blocking member 158 corresponding to the water blocking member 58 is provided around the tubular part 156.

The slot part 134 corresponding to the slot part 34 is formed to have a smaller length and a larger width than the slot part 34, in accordance with the branch connector apparatus 140. The battery-side connector 32 is provided at a position close to the one side in the slot part 134.

According to the present embodiment, the same effects as those of the first embodiment are exerted, except the effects exerted due to the provision of the connector 48 on the depth side in the insertion direction with respect to the housing 50 and the effects exerted due to the provision of the pair of right and left guided parts 54.

Further, in the present embodiment, the connector 148 is provided on a lateral side of the housing 150, and thus there is an advantage that the length of an installation space of the branch connector apparatus 140 can be reduced.

The connector 148 is disposed on a further front side of the branch connector apparatus 140 in the insertion direction than the guided part 54. Thus, when the branch connector apparatus 140 is inserted into the slot part 134, the guided part 54 is guided by the guiding part 62 as early as possible. Further, in such a guided state, the connector 148 can be arranged to be coupled to the battery-side connector 32.

MODIFICATIONS

In the first embodiment etc., the horizontal cross-sectional shape of the guiding part 62 need not necessarily be different in the first area T1 and the second area T2.

The description of the first and second embodiments is given by taking an example in which the guided part 54 has a projecting shape and the guiding part 62 has a groove shape. The guided part 54 and the guiding part 62, however, need not necessarily have such shapes. For example, the guided part 54 may have a shape with a groove, and the guiding part may have an elongated projecting shape to be fitted into the groove. In this case, by arranging the guiding part 62 to have different width, thickness, etc. in the first area T1 and the second area T2, the clearance for the guided part 54 can be arranged to have different dimensions in the first area T1 and the second area T2.

Further, the branch connector apparatuses 40 and 140 can also be applied as a connector apparatus for establishing a connection with a device other than the battery pack 22.

Note that each configuration described in each embodiment and each modification can be combined with another as appropriate on the condition that the combination remains consistent.

While the disclosure has been shown and described in detail, the foregoing description is in all aspects illustrative and not restrictive. It is therefore understood that numerous modifications and variations can be devised.

We claim:

1. A power supply apparatus comprising:
a battery pack for a motor vehicle, the battery pack including a first housing having an outer wall enclosing a space, a battery disposed within the space; and
a power interface part configured to connect the battery pack and a plurality of electrical devices, wherein
the power interface part includes
a battery-side connector electrically connected to a battery of the battery pack, and
a branch connector apparatus to be coupled to the battery-side connector,
the branch connector apparatus being configured to supply power from the battery to the plurality of electrical devices in a state in which the branch connector apparatus is coupled to the battery-side connector,
the branch connector apparatus includes
a joining part configured to electrically join a plurality of connection lines to be connected to respective ones of the plurality of electrical devices,
at least one fuse provided to correspond to at least one of the plurality of connection lines,
a second housing configured to accommodate the joining part and the at least one fuse,
a connector to be coupled to the battery-side connector, the connector including a terminal electrically connected to the joining part, and
a guided part provided on an outer side surface of the second housing,
the battery pack includes
a slot part disposed within the first housing, the slot part allowing the branch connector apparatus to be inserted and extracted within the space of the first housing, the battery-side connector being provided in the slot part, and
a guiding part being provided at a portion of an inner side surface of the slot part facing the guided part, the guiding part extending along an insertion and extraction direction of the branch connector apparatus with respect to the slot part, and
the guided part is guided along an extension direction of the guiding part by the guiding part.

2. The power supply apparatus according to claim 1, wherein the at least one fuse, the joining part, and the connector are disposed along the insertion and extraction direction.

3. The power supply apparatus according to claim 1, wherein the connector is supported at a lateral side of the second housing, and
the connector is disposed on a further front side in an insertion direction of the branch connector apparatus than the guided part.

4. The power supply apparatus according to claim 1, wherein the second housing includes, in the insertion and extraction direction, a first end portion, and a second end portion farther from the battery-side connector than the first end portion, and
the guided part is disposed close to the first end portion in the insertion and extraction direction.

5. The power supply apparatus according to claim 4, wherein the second housing includes a first leading part configured to lead the guided part into the guiding part, and
the first leading part is provided at the first end portion of the second housing, and is formed continuously to the guided part in the insertion and extraction direction.

6. The power supply apparatus according to claim 1, wherein the guiding part includes, in the insertion and extraction direction, a first area, and a second area farther from the battery-side connector than the first area, and
a clearance allowing movement of the guided part with respect to the guiding part in a direction perpendicular to the extension direction of the guiding part is larger in the first area than in the second area.

7. The power supply apparatus according to claim 6, wherein a clearance allowing movement of the guided part with respect to the guiding part in a first direction perpendicular to the insertion and extraction direction is larger in the first area than in the second area.

8. The power supply apparatus according to claim 7, wherein a clearance allowing movement of the guided part with respect to the guiding part in a second direction perpendicular to both the insertion and extraction direction and the first direction is larger in the first area than in the second area.

9. The power supply apparatus according to claim 6, wherein a length of the guided part is smaller than a length of the first area in the insertion and extraction direction.

10. The power supply apparatus according to claim 1, wherein a second leading part configured to lead the guided part into the guiding part is provided in the slot part, and
the second leading part is formed continuously to the guiding part on a side away from the battery-side connector in the insertion and extraction direction.

11. The power supply apparatus according to claim 1, wherein the battery pack includes a case configured to accommodate the slot part inside,
the branch connector apparatus includes a tubular part surrounding a part of an outer side surface of the second housing, and a water blocking member having an annular shape being provided on an outer side surface of the tubular part,
the case includes an opening allowing an internal space of the slot part to communicate with an outer space of the battery pack,
the opening is disposed at a position farther from the battery-side connector than the guiding part in the insertion and extraction direction, and
the water blocking member comes into contact with an inner side surface of the opening in a state in which the connector and the battery-side connector are coupled.

12. A branch connector apparatus to be connected to a device including a guiding part on an inner side surface of a slot part of a first housing of a battery pack, the branch connector apparatus comprising:
- a joining part configured to electrically join a plurality of connection lines to be connected to respective ones of a plurality of electrical devices;
- at least one fuse provided to correspond to at least one of the plurality of connection lines;
- a housing configured to be inserted into and extracted from the slot part, the joining part and the at least one fuse disposed within the housing so as to electrically connect and disconnect the device;
- a connector to be coupled to a connector within the slot part, the connector including a terminal electrically connected to the joining part; and
- a guided part provided on an outer side surface of the housing, wherein
- the guided part is guided along an extension direction of the guiding part by the guiding part.

13. The power supply apparatus according to claim 1, wherein the joining part includes a plurality of branch end portions and one joined end portion, the plurality of branch end portions and the one joined end portion are electrically joined.

14. The branch connector apparatus according to claim 12, wherein the joining part includes a plurality of branch end portions and one joined end portion, the plurality of branch end portions and the one joined end portion are electrically joined.

* * * * *